United States Patent
Dallet et al.

(10) Patent No.: US 12,326,011 B2
(45) Date of Patent: Jun. 10, 2025

(54) CONCEPTS AND METHODS FOR COMMUNICATING WITH EQUIPMENT SUCH AS AUTOMATIC SWIMMING POOL CLEANERS VIA ACCELEROMETERS OR OTHER SENSORS, MOTORS, OR BOTH

(71) Applicant: ZODIAC POOL CARE EUROPE, Belberaud (FR)

(72) Inventors: Florent Dallet, Ramonville-Saint-Agne (FR); Simon Duffaut, Castelginest (FR); Louis Favie, Colomiers (FR)

(73) Assignee: ZODIAC POOL CARE EUROPE, Belberaud (FR)

( * ) Notice: Subject to any disclaimer, the term of this patent is extended or adjusted under 35 U.S.C. 154(b) by 255 days.

(21) Appl. No.: 17/395,752

(22) Filed: Aug. 6, 2021

(65) Prior Publication Data
US 2022/0042336 A1    Feb. 10, 2022

Related U.S. Application Data

(60) Provisional application No. 63/061,910, filed on Aug. 6, 2020.

(51) Int. Cl.
*E04H 4/16* (2006.01)
*G05D 1/00* (2024.01)
*G08B 3/00* (2006.01)
*G08B 5/36* (2006.01)

(52) U.S. Cl.
CPC ......... *E04H 4/1654* (2013.01); *G05D 1/0088* (2013.01); *G05D 1/0206* (2013.01); *G08B 3/00* (2013.01); *G08B 5/36* (2013.01)

(58) Field of Classification Search
CPC .................................................. E04H 4/1654
See application file for complete search history.

(56) References Cited

U.S. PATENT DOCUMENTS

| 3,422,478 | A | 1/1969 | Osborne |
| 8,771,504 | B2 | 7/2014 | Mastio et al. |
| 9,250,626 | B2 | 2/2016 | Michelon |
| 2018/0044936 | A1* | 2/2018 | Torem ................. G05D 1/0291 |
| 2018/0120833 | A1* | 5/2018 | Lindhé .................. A47L 9/2852 |

(Continued)

FOREIGN PATENT DOCUMENTS

| CN | 110080572 | 8/2019 |
| EP | 0989256 A1 | 3/2000 |
| EP | 3282072 | 2/2018 |

(Continued)

OTHER PUBLICATIONS

Machine translation: KR20190035375; Kim, J. (Year: 2019).*

(Continued)

*Primary Examiner* — Natasha N Campbell
(74) *Attorney, Agent, or Firm* — Kilpatrick Townsend & Stockton LLP (57) ABSTRACT

Techniques and methods for wirelessly communicating with equipment such as, but not necessarily limited to, automatic swimming pool cleaners (APCs) are detailed. An accelerometer or other sensor on-board an APC may recognize such communications. In some cases, varying operation of a motor or other feedback generator of the APC may provide sonic or other feedback in response to the communications.

15 Claims, 3 Drawing Sheets

(56) References Cited

U.S. PATENT DOCUMENTS

2018/0266131 A1* 9/2018 Witelson ............ G01N 33/1826
2019/0345728 A1* 11/2019 Adlivankin ......... A47L 11/4061

FOREIGN PATENT DOCUMENTS

| EP | 3318702 | | 5/2018 | |
| KR | 20190035375 A | * | 4/2019 | |
| WO | WO-2015090401 A1 | * | 6/2015 | ........... A47L 9/2857 |
| WO | 2017046808 A1 | | 3/2017 | |

OTHER PUBLICATIONS

PCT Application No. PCT/IB2021/057279, International Search Report and Written Opinion mailed on Jan. 18, 2022, 17 pages.
International Application No. PCT/IB2021/057279, International Preliminary Report on Patentability, mailed on Feb. 16, 2023, 11 pages.
International Application No. PCT/IB2021/057279, Invitation to Pay Additional Fees and, Where Applicable, Protest Fee mailed on Nov. 10, 2021, 22 pages.
European Application No. 21758142.0, Office Action mailed on Dec. 17, 2024, 6 pages.

* cited by examiner

CONCEPTS AND METHODS FOR COMMUNICATING WITH EQUIPMENT SUCH AS AUTOMATIC SWIMMING POOL CLEANERS VIA ACCELEROMETERS OR OTHER SENSORS, MOTORS, OR BOTH

REFERENCE TO RELATED APPLICATION

This application claims the benefit of U.S. Provisional Patent Application No. 63/061,910, filed on Aug. 6, 2020 and entitled CONCEPTS AND METHODS FOR COMMUNICATING WITH EQUIPMENT SUCH AS AUTOMATIC SWIMMING POOL CLEANERS VIA ACCELEROMETERS, MOTORS, OR BOTH, the content of which is hereby incorporated by reference in its entirety.

FIELD OF THE INVENTION

This invention relates to communicating with equipment configured to operate underwater and more particularly, although not necessarily exclusively, to concepts and methods for wirelessly communicating with autonomous vehicles such as automatic pool cleaners ("APCs") configured to operate in swimming pools or spas.

BACKGROUND

Commonly-owned U.S. Pat. No. 9,250,626 to Michelon describes an exemplary apparatus (often called a "robot" or a "robotic APC") for cleaning a swimming pool. The apparatus includes wheels or other motive elements and is configured to travel autonomously within the pool. It further may be connected via cable to an "intermediate relay," or control box, positioned near the pool. The external control box may receive signals from a wireless transmitter of a remote control device and forward control information to the cleaning apparatus through the cable. In particular, because of known difficulties in transmitting wireless radio frequency (RF) signals substantial distances through water, the control box is not positioned within the pool, nor does the wireless transmitter of the remote control device communicate directly with the underwater APC. The control box thus indeed functions as an "intermediate relay," in that it receives control information wirelessly externally of the pool and relays it via wire to the submerged cleaner within the pool.

Commonly-owned U.S. Pat. No. 8,771,504 to Mastio, et al. details another exemplary robotic APC. Like APCs of the Michelon patent, those of the Mastio patent may include wheels or other motive elements as well as, e.g., pumps and motors. Further included in the APCs may be one or more accelerometers, with the Mastio patent explaining that such accelerometer device:

is configured to provide instantaneous acceleration measurements of at least one acceleration component of the terrestrial gravity in at least one fixed direction . . . . [S]imple detection of the orientation of at least one fixed direction of the apparatus relative to the gravitational accelerometer, that is to say, relative to the local vertical, is sufficient in practice to determine with a very high degree of reliability the movement behavior of the apparatus over the immersed surface [of a swimming pool].

See Mastio, col. 2, ll. 36-55.

SUMMARY

Embodiments covered by this patent are defined by the claims below, not this summary. This summary is a high-level overview of various embodiments and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

According to certain embodiments, a method of communicating with an automatic swimming pool cleaner configured to operate within water of a swimming pool includes creating a vibration recognizable by an accelerometer of the automatic swimming pool cleaner.

In some embodiments, the vibration is created either externally of, or internally within, the swimming pool and furnishes an operating instruction to the automatic swimming pool cleaner. In various embodiments, the vibration is created by a human. In some embodiments, the vibration is created by a non-human such as a vibration device.

According to various embodiments, a method of communicating with an automatic swimming pool cleaner configured to operate within water of a swimming pool includes tilting the automatic swimming pool cleaner in a manner recognizable by an accelerometer of the automatic swimming pool cleaner.

In certain examples, the tilting occurs either externally of, or internally within, the swimming pool and furnishes an operating instruction to the automatic swimming pool cleaner. The tilting may be performed by a human or by a non-human, such as using a tilting device.

According to some embodiments, an automatic swimming pool cleaner includes means for receiving vibrations or tilts and processing the vibrations or tilts as operating instructions.

In various embodiments, an automatic swimming pool cleaner includes means for providing feedback that a vibration or tilt has been received and processed as an operating instruction.

According to certain embodiments, an automatic swimming pool cleaner includes means for receiving information relating to a physical change of the automatic swimming pool cleaner, including but not limited to a change in rotation or orientation of the automatic swimming pool cleaner, and processing the physical change as an operating instruction.

In various embodiments, a system, method, or cleaner further includes providing feedback from a motor of the automatic swimming pool cleaner that a vibration or tilt has been received and processed as an operating instruction.

According to some embodiments, a method of communicating with an automatic swimming pool cleaner configured to operate within water of a swimming pool includes creating a vibration recognizable by an accelerometer of the automatic swimming pool cleaner, wherein the vibration furnishes an operating instruction to the automatic swimming pool cleaner.

According to certain embodiments, a method of communicating with an automatic swimming pool cleaner configured to operate within water of a swimming pool includes tilting the automatic swimming pool cleaner in a manner recognizable by an accelerometer of the automatic swimming pool cleaner, wherein the tilting furnishes an operating instruction to the automatic swimming pool cleaner.

According to various embodiments, an automatic swimming pool cleaner includes a housing, a sensor configured to detect at least one vibration or tilt, and a controller configured to receive the at least one vibration or tilt detected by the sensor and determine an operating instruction for the automatic swimming pool cleaner based on the detected vibration or the detected tilt.

According to certain embodiments, an automatic swimming pool cleaner includes a housing, a sensor configured to detect a physical change of the automatic swimming pool cleaner, and a controller configured to determine an operating instruction for the automatic swimming pool cleaner based on the detected physical change by the sensor.

According to some embodiments, a method of controlling an automatic swimming pool cleaner configured to operate within water of a swimming pool includes detecting, by a sensor on the automatic swimming pool cleaner, a physical change of the automatic swimming pool cleaner. The method includes determining, by a controller on the automatic swimming pool cleaner, an operating instruction for the automatic swimming pool cleaner based on the detected physical change, and controlling, by the controller, the automatic swimming pool cleaner pursuant to the determined operating instruction.

Various implementations described herein can include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The specification makes reference to the following appended figures, in which use of like reference numerals in different figures is intended to illustrate like or analogous components.

DETAILED DESCRIPTION

The subject matter of embodiments is described herein with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Directional references such as "up," "down," "top," "bottom," "left," "right," "front," and "back," among others, are intended to refer to the orientation as illustrated and described in the figure (or figures) to which the components and directions are referencing. References to "pools" and "swimming pools" herein may also refer to spas or other water containing vessels used for recreation or therapy.

Described herein are systems and methods for communicating with a piece of equipment for a pool system, including but not limited to an APC. In certain embodiments, the systems and methods described herein may provide techniques and methods for communicating wirelessly with such cleaners when submerged in pools, although the techniques and methods could be used as well when the APCs are outside of swimming pools. Advantageously, the communication sources will be recognized by an accelerometer or other suitable device or sensor within or otherwise on-board a cleaner. In some cases, the APC may also provide sonic feedback by, for example, varying operation of its motor or activating a buzzer, speaker, or other device. Although the systems and methods are described for use in connection with water containing vessels, persons skilled in the relevant field will recognize that the present invention may be employed in other manners.

Figure 1:
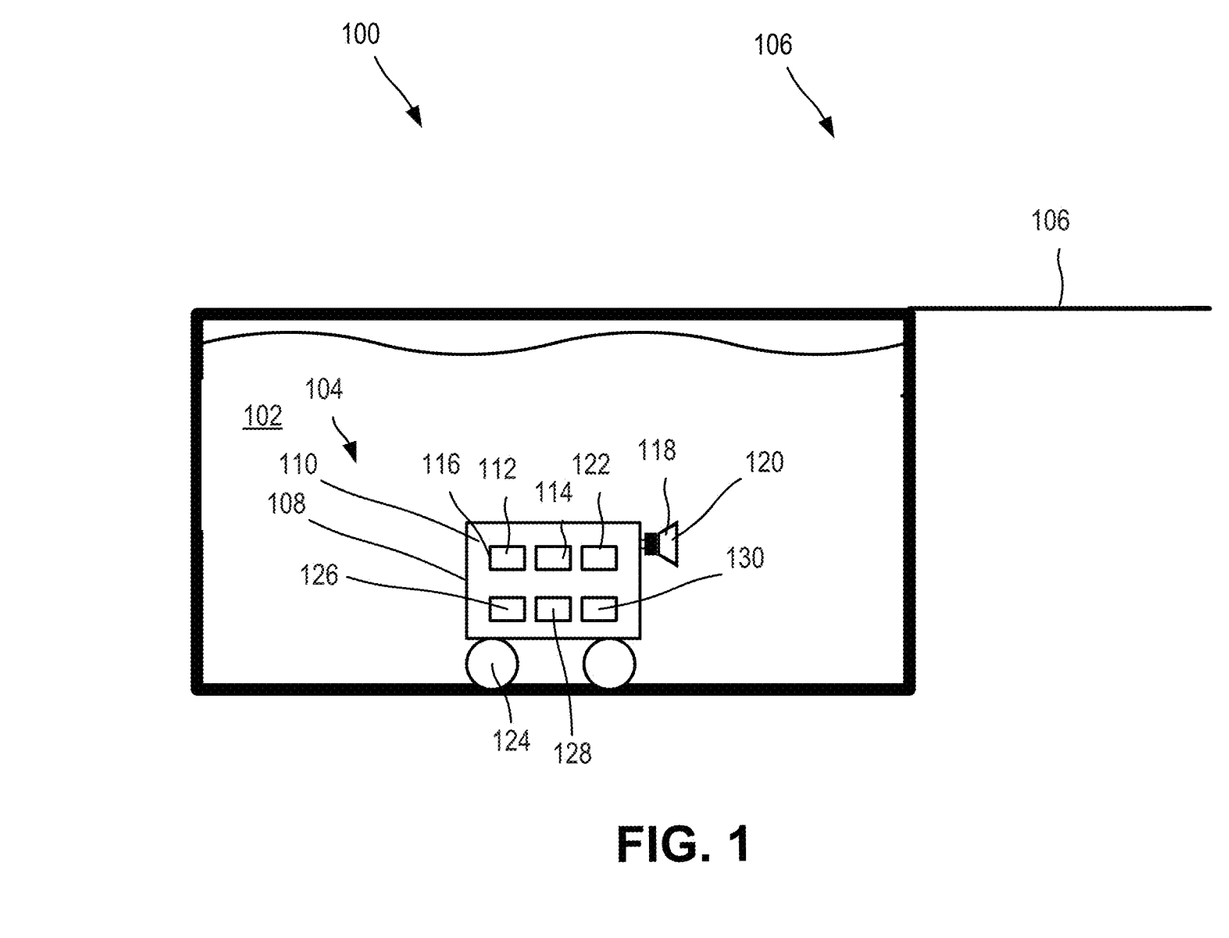
FIG. 1 illustrates a pool system with a piece of equipment according to embodiments of the disclosure.

FIG. 1 illustrates an example of a pool system 100 according to various embodiments. The pool system 100 may be a pool, spa, etc. that includes a body of water 102. In various embodiments, the pool system 100 includes at least one piece of equipment 104. Optionally, a deck 106 or other suitable surface or structure may at least partially surround the body of water 102.

The at least one piece of equipment 104 may be various suitable pieces of equipment that perform various tasks in and/or around the body of water 102. In certain embodiments, the piece of equipment 104 may be submerged within the body of water 102. In the embodiment of FIG. 1, the piece of equipment 104 is a battery-powered, robotic APC 108 that may be submerged within the water 102. The APC 108 includes a housing 110, a sensor 112, and a controller 114 communicatively coupled to the sensor 112. In certain embodiments, the sensor 112 and/or the controller 114 may be provided within the housing 110, although they need not be in other embodiments.

The sensor 112 may be various devices or components configured to receive or detect a wireless signal. In certain embodiments, the sensor 112 may be various devices or components that may detect a vibration on the APC 108, a tilting of the APC 108, a change in orientation of the APC 108, a change in rotation of the APC 108, other physical changes in the APC 108, combinations thereof, and/or other wireless signals as desired. In the embodiment of FIG. 1, the sensor 112 is an accelerometer 116. In other embodiments, the sensor 112 may include but is not limited to gyroscopes, compasses, and/or other devices capable of discerning changes caused by vibrations, tilting, or other physical changes of the APC 108. While a single sensor 112 is illustrated, in other embodiments the APC 108 may include a plurality of sensors 112. In such embodiments, the sensors 112 may be the same type of sensor, although they need not be in other embodiments.

The controller 114 may be any suitable computing device or combination of devices with a processor and/or memory that may receive the detected wireless signal from the sensor 112 and determine an operating instruction for the APC 108 based on at least one characteristic of the detected wireless signal. In certain embodiments, and as discussed in detail below, the controller 114 may control the APC 108 pursuant to the determined operating instruction. Non-limiting examples of operating instructions include but are not limited to making linear movements with the APC 108, making rotational movements of the APC 108, surfacing the APC 108, deactivating components of the APC 108, and/or energizing components of the APC 108, subcombinations thereof, or other instructions as desired.

In certain embodiments, the APC 108 also includes a feedback generator 118 that is communicatively coupled to the controller 114 and/or the sensor 112. In certain embodiments, the feedback generator 118 may generate a feedback signal or response responsive to at least one of the detection of the wireless signal by the sensor 112 and/or the determination of the operating instruction by the controller 114. The feedback generator 118 may be various suitable devices or components for generating a feedback signal, including but not limited to a light source, a speaker, a buzzer, an alarm, other visual-generating and/or sound-generating devices, combinations thereof, or other suitable devices or mechanisms as desired. In one non-limiting example, the feedback generator 118 may be a motor of the APC 108. In such embodiments, a separate feedback generator need not be provided separately from the motor, although one may be in other embodiments. In the embodiment of FIG. 1, the feedback generator 118 is a speaker 120 that may generate a buzzer sound, alarm, and/or other sound signal as desired.

Optionally the APC 108 may include various other devices and components in addition to the sensor 112 and the controller 114 as desired. In some non-limiting examples, the APC 108 may include a communications module 122 enabling the APC 108 to receive and transmit other wireless signals as desired. Additionally or alternatively, the APC 108 optionally may include one or more motive elements 124 for moving the APC 108 autonomously within the body of water 102. Suitable motive elements 124 include but are not limited to wheels, tracks, rollers, feet, combinations thereof, and/or other suitable devices or mechanisms as desired. Additionally or alternatively, the APC 108 also may include one or more of a motor 126, a pump 128, and a debris filter 130, among other features. As mentioned, in certain embodiments, the motor 126 may optionally be a feedback generator of the APC 108. In other embodiments, other components of the APC 108 including but not limited to the pump 128 may be the feedback generator. In certain embodiments, the components of the APC 108 optionally may be communicatively coupled to the controller 114 and/or selectively controlled by the controller 114. The particular features illustrated with the APC 108 should not be considered limiting, and in other embodiments, the APC 108 may include fewer and/or additional features as desired. As two non-limiting examples, in other embodiments, the APC 108 may be similar to that described in the Michelon and Mastio patents, both of which are herein incorporated by reference in their entireties.

Figure 2:
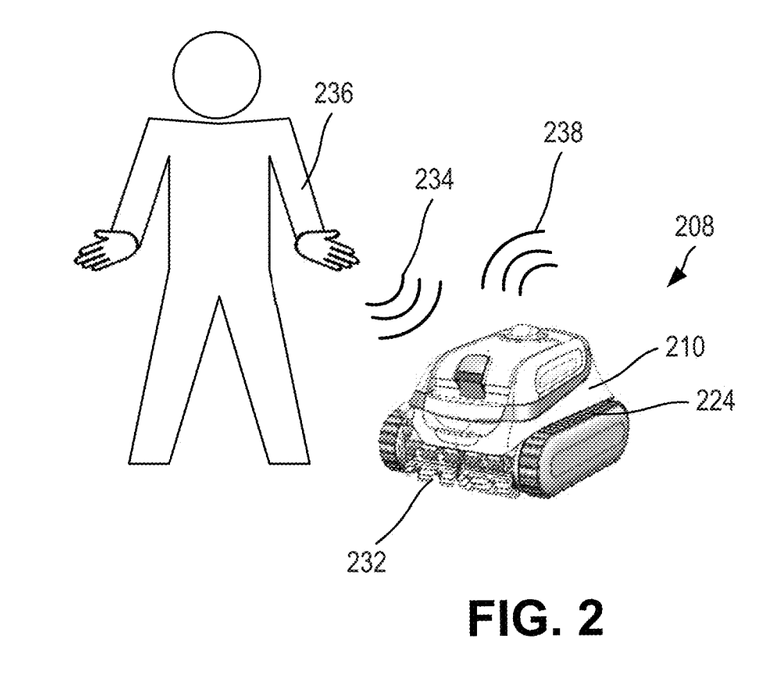
FIG. 2 illustrates a person controlling a piece of equipment for a pool system according to embodiments of the disclosure.
Figure 3A:
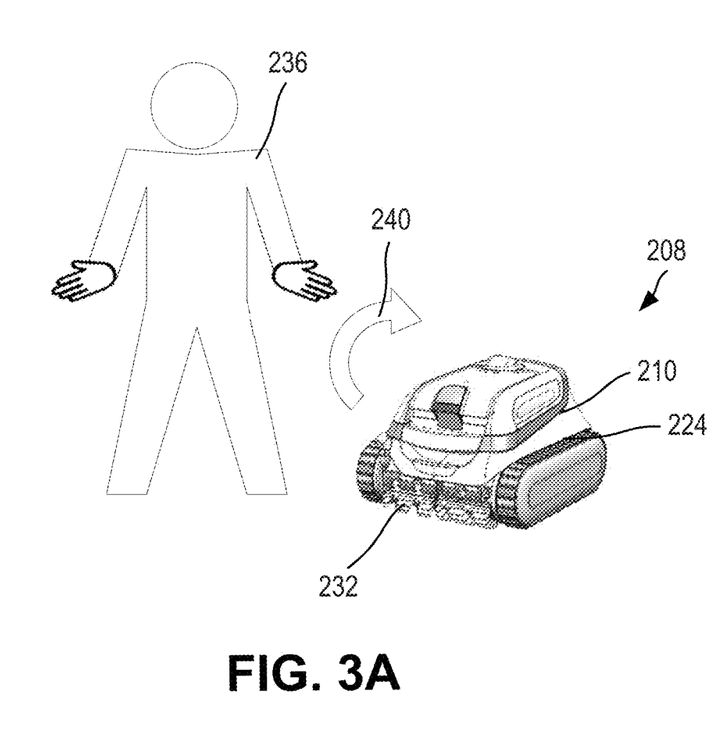
FIGS. 3A-B illustrate a person controlling a piece of equipment for a pool system according to embodiments of the disclosure.
Figure 3B:
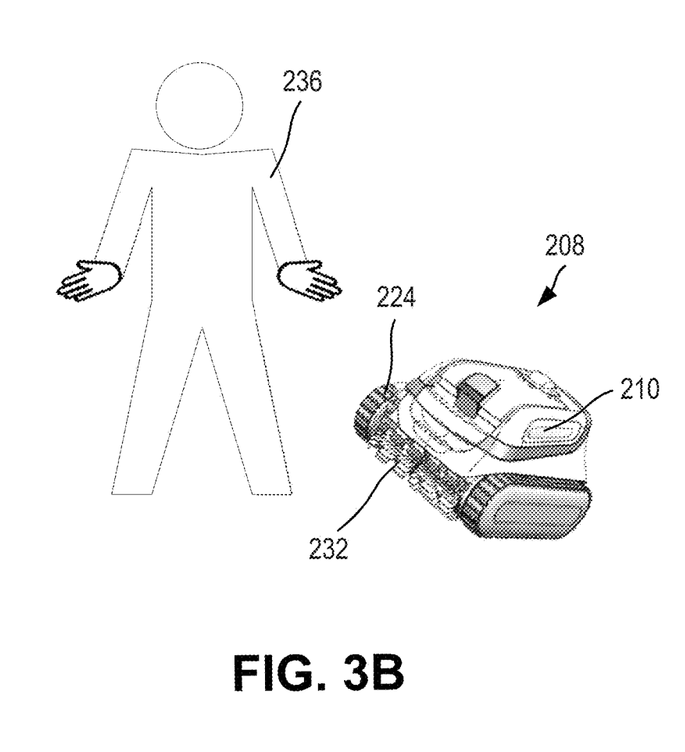

FIGS. 2-3B illustrate another example of an APC 208 according to various embodiments. The APC 208 is substantially similar to the APC 108 and includes a housing 210, a sensor, a controller, a feedback generator, and motive elements 224. The sensor, feedback generator and controller are housed within the housing 210 of the APC 208 and thus are not visible in FIGS. 2-3B. Compared to the APC 108, the APC 208 also includes a brush 232. The housing 210 is a different shape compared to the housing 110 of the APC 108, and the motive elements 224 of the APC 208 are tracks compared to the wheels of the APC 108. The APC 208 may include various other devices or features as desired. Similar to the APC 108, the sensor of the APC 208 is an accelerometer that detects a physical change to the APC 208, including but not limited to vibrations, orientation, rotation, tilt, and/or other physical changes to the APC 208.

As illustrated in FIG. 2, in certain embodiments, vibrations 234 optionally may be employed to communicate with the APC 208. Alternatively or additionally, orientation, rotation, or other physical changes may be utilized to communicate with the APC 208.

In the embodiment of FIG. 2, a user 236 may create the vibrations 234 by, for example, tapping on the APC 208, otherwise physically contacting the APC 208 to generate vibrations as desired, and/or as otherwise desired. In certain embodiments, the vibrations 234 may be created by a non-human, including but not limited to a vibration-generating device or machine. The sensor on-board the APC 208 may detect the vibrations including at least one characteristic of the vibrations, and the controller of the APC 208 may process the detected vibrations as instructions for cleaner operation. In certain embodiments, the determined operating instructions may be at least partially based on the at least one characteristic of the vibrations 234. The at least one characteristic of the vibrations 234 may include but is not limited to a pattern of vibrations/taps on the APC 208, a duration of the vibrations 234, an intensity of the vibrations 234, a location on the APC 208 where the vibrations 234 are detected, combinations thereof, and/or other characteristics as desired. In certain embodiments where the sensor detects additional or other physical changes, the at least one characteristic may be other characteristics as desired. As some non-limiting examples, the at least one characteristic of the detected physical change may include but is not limited to an angle of rotation of the APC 208, a tilt angle of the APC 208, a number of rotations of the APC 208, a number of tilting actions of the APC 208, a pattern of rotations and/or tilting actions of the APC 208, combinations thereof, and/or other characteristics of the detected physical changes as desired.

As one of many possible non-limiting examples, a set of three manual taps (generating three discrete vibratory pulses) on the housing 210 of the APC 208 could be interpreted by the controller of the APC 208 as an instruction to begin a cleaning cycle, and a set of two manual taps could be interpreted by the controller of the APC 208 as an instruction that the APC 208 should cease movement. Of course, persons skilled in the art will recognize that other techniques for creating vibrations may be employed instead, and if sets of pulses are formed, they could correspond to different instructions than mentioned in the above example. Indeed, the vibratory-creation techniques could involve humans (including hands, feet, voices, etc.), mechanical vibration mechanisms, electrical vibration mechanisms, or otherwise.

Optionally, and as illustrated in FIG. 2, the APC 208 may provide a feedback indication 238 indicating its receipt of any instruction, for example. Such indication 238 could be provided by the motor of the APC 208 changing its frequency, speed, or pattern of operation, which a user or sound-receiving device could recognize as a change in sound from the cleaner. Alternatively or additionally, a buzzer, speaker, or other device could be actuated to provide sounds. Other sorts of feedback indication 238 (electronic, optical, ultrasonic, etc.) could be created instead or in addition. In the embodiment of FIG. 2, the feedback indication 238 is provided by the motor of the APC 208.

Moreover, in some embodiments, a characteristic of the feedback indication 238 may be adjusted to provide various wireless communication back to the user 236 or a sound-receiving device. As a non-limiting example, the controller of the APC 208 may rev the motor once indicating that the signal has been received and interpreted as an operating instruction, and the controller of the APC 208 may rev the motor three times indicating that the signal has been received but cannot be interpreted by the controller.

In certain embodiments, and as illustrated in FIGS. 3A-B, other physical changes may be provided to the APC 208 and detected by the sensor of the APC 208 to provide operational information in addition to or instead of the vibrations. FIGS. 3A-B illustrate a physical change of tilting (represented by arrow 240) of the APC 208 from a base position (FIG. 3A) to a tilted position (FIG. 3B). In various embodiments, the APC 208 may be tilted in any axis as desired, and in some embodiments, tilting in different axes optionally may be used to provide different operating instructions to the APC 208. In certain embodiments, the sensor of the APC 208 may detect the tilting of the APC 208 and/or at least one characteristic of the physical change due to tilting (e.g., tilt angle, number of tilting motions, a pattern of tilting motions, an axis on which the APC 208 is tilted, a pattern of axes in which the APC 208 is tilted, etc.) and the controller of the APC 208 may determine the operating instruction based on the detected tilting and/or characteristic of the change due to tilting. In various embodiments, the user 236 may tilt the APC 208 such as by grasping the APC 208 manually, gently kicking or raising the APC 208 with his or her foot, and/or as otherwise desired. In other embodiments, tilting may occur using a suitable object, device, or mechanism as desired, such as using a tilting device to tilt the APC 208.

Although the foregoing examples are useful in describing aspects of the invention, persons skilled in the art will recognize that the invention is not limited to use of any particular ones of the disclosed actions. As noted above, the wireless signals may be various physical changes in the APC or other wireless signals as otherwise desired. Further, the characteristic of the wireless signal used to control the piece of equipment need not be a duration and/or pattern and may be other characteristics of the signal as desired. Yet further, the wireless signals may provide other instructions to an APC, such as (but not limited to) stopping movement, changing speed of movement, changing direction of linear or rotational movement, etc.

A collection of exemplary embodiments are provided below, including at least some explicitly enumerated as "Illustrations" providing additional description of a variety of example embodiments in accordance with the concepts described herein. These illustrations are not meant to be mutually exclusive, exhaustive, or restrictive; and the disclosure not limited to these example illustrations but rather encompasses all possible modifications and variations within the scope of the issued claims and their equivalents.

Illustration 1. A method of communicating with an automatic swimming pool cleaner configured to operate within water of a swimming pool, comprising creating a vibration recognizable by an accelerometer or other suitable sensor of the automatic swimming pool cleaner.

Illustration 2. A method according to any preceding or subsequent illustrations or combination of illustrations in which the vibration is created either externally of, or internally within, the swimming pool and furnishes an operating instruction to the automatic swimming pool cleaner.

Illustration 3. A method to any preceding or subsequent illustrations or combination of illustrations in which the vibration is created by a human.

Illustration 4. A method to any preceding or subsequent illustrations or combination of illustrations in which the vibration is created by a non-human.

Illustration 5. A method of communicating with an automatic swimming pool cleaner configured to operate within water of a swimming pool, comprising tilting the automatic swimming pool cleaner in a manner recognizable by an accelerometer or other suitable sensor of the automatic swimming pool cleaner.

Illustration 6. A method to any preceding or subsequent illustrations or combination of illustrations in which the tilting occurs either externally of, or internally within, the swimming pool and furnishes an operating instruction to the automatic swimming pool cleaner.

Illustration 7. A method according to any preceding or subsequent illustrations or combination of illustrations in which the tilting is performed by a human.

Illustration 8. A method to any preceding or subsequent illustrations or combination of illustrations in which the tilting is performed by a non-human.

Illustration 9. An automatic swimming pool cleaner comprising means for receiving vibrations or tilts and processing the vibrations or tilts as operating instructions.

Illustration 10. An automatic swimming pool cleaner to any preceding or subsequent illustrations or combination of illustrations further comprising means for providing feedback that a vibration or tilt has been received and processed as an operating instruction.

Illustration 11. An automatic swimming pool cleaner comprising means for receiving information relating to a physical change of the automatic swimming pool cleaner, including but not limited to a change in rotation or orientation of the automatic swimming pool cleaner, and processing the physical change as an operating instruction.

Illustration 12. A method to any preceding or subsequent illustrations or combination of illustrations further comprising providing feedback from a motor of the automatic swimming pool cleaner that a vibration or tilt has been received and processed as an operating instruction.

Illustration 13. A method of communicating with an automatic swimming pool cleaner configured to operate within water of a swimming pool, the method comprising: creating a vibration recognizable by an accelerometer of the automatic swimming pool cleaner, wherein the vibration furnishes an operating instruction to the automatic swimming pool cleaner.

Illustration 14. The method of any preceding or subsequent illustrations or combination of illustrations, wherein creating the vibration comprises generating the vibration externally of the swimming pool.

Illustration 15. The method of any preceding or subsequent illustrations or combination of illustrations, wherein creating the vibration comprises generating the vibration internally within the swimming pool.

Illustration 16. The method of any preceding or subsequent illustrations or combination of illustrations, wherein creating the vibration comprises generating the vibration with a vibration device.

Illustration 17. The method of any preceding or subsequent illustrations or combination of illustrations, further comprising tilting the automatic swimming pool cleaner in a manner recognizable by the accelerometer of the automatic swimming pool cleaner, wherein the tilting furnishes an operating instruction to the automatic swimming pool cleaner.

Illustration 18. A method of communicating with an automatic swimming pool cleaner configured to operate within water of a swimming pool, the method comprising: tilting the automatic swimming pool cleaner in a manner recognizable by an accelerometer of the automatic swimming pool cleaner, wherein the tilting furnishes an operating instruction to the automatic swimming pool cleaner.

Illustration 19. The method of any preceding or subsequent illustrations or combination of illustrations, wherein tilting the automatic swimming pool cleaner comprises tilting the automatic swimming pool cleaner externally of the swimming pool.

Illustration 20. The method of any preceding or subsequent illustrations or combination of illustrations, wherein tilting the automatic swimming pool cleaner comprises tilting the automatic swimming pool cleaner internally within the swimming pool.

Illustration 21. The method of any preceding or subsequent illustrations or combination of illustrations, wherein tilting the automatic swimming pool cleaner comprises tilting the automatic swimming pool cleaner with a tilting device.

Illustration 22. An automatic swimming pool cleaner comprising: a housing; and a sensor configured to detect at least one vibration or tilt; and a controller configured to receive the at least one vibration or tilt detected by the sensor and determine an operating instruction for the automatic swimming pool cleaner based on the detected vibration or the detected tilt.

Illustration 23. The automatic swimming pool cleaner of any preceding or subsequent illustrations or combination of illustrations, wherein the controller is further configured to control the automatic swimming pool pursuant to the determined operating instruction based on the at least one vibration or tilt detected by the sensor.

Illustration 24. The automatic swimming pool cleaner of any preceding or subsequent illustrations or combination of illustrations, wherein the operating instruction comprises at least one of making linear movements with the automatic swimming pool cleaner, making rotational movements of the swimming pool cleaner, surfacing the automatic swimming pool cleaner, deactivating components of the automatic swimming pool cleaner, or energizing components of the automatic swimming pool cleaner.

Illustration 25. The automatic swimming pool cleaner of any preceding or subsequent illustrations or combination of illustrations, further comprising a feedback generator configured to provide feedback responsive to the at least one of the detected vibration or the detected tilt has been received by the sensor and processed by the controller as an operating instruction.

Illustration 26. The automatic swimming pool cleaner of any preceding or subsequent illustrations or combination of illustrations, wherein the feedback generator is a motor of the automatic swimming pool cleaner.

Illustration 27. The automatic swimming pool cleaner of any preceding or subsequent illustrations or combination of illustrations, wherein the feedback generator comprises a speaker or light source on the housing.

Illustration 28. The automatic swimming pool cleaner of any preceding or subsequent illustrations or combination of illustrations, wherein the sensor is configured to detect both a tilt and a vibration, and wherein the controller is configured to determine a first operating instruction based on the detected tilt and a second operating instruction based on the detected vibration.

Illustration 29. The automatic swimming pool cleaner of any preceding or subsequent illustrations or combination of illustrations, wherein the sensor comprises an accelerometer within the housing.

Illustration 30. The automatic swimming pool cleaner of any preceding or subsequent illustrations or combination of illustrations, further comprising a motor, a pump, a debris filter, and at least one motive element.

Illustration 31. An automatic swimming pool cleaner comprising: a housing; a sensor configured to detect a physical change of the automatic swimming pool cleaner; and a controller configured to determine an operating instruction for the automatic swimming pool cleaner based on the detected physical change by the sensor.

Illustration 32. The automatic swimming pool cleaner of any preceding or subsequent illustrations or combination of illustrations, wherein the physical change comprises at least one of a change in rotation or a change in orientation of the automatic swimming pool cleaner.

Illustration 33. The automatic swimming pool cleaner of any preceding or subsequent illustrations or combination of illustrations, wherein the controller is further configured to control the automatic swimming pool cleaner pursuant to the determined operating instruction based on the detected physical change by the sensor.

Illustration 34. The automatic swimming pool cleaner of any preceding or subsequent illustrations or combination of illustrations, wherein the operating instruction comprises at least one of making linear movements with the automatic swimming pool cleaner, making rotational movements of the swimming pool cleaner, surfacing the automatic swimming pool cleaner, deactivating components of the automatic swimming pool cleaner, or energizing components of the automatic swimming pool cleaner.

Illustration 35. The automatic swimming pool cleaner of any preceding or subsequent illustrations or combination of illustrations, further comprising a feedback generator configured to provide feedback responsive to the detected physical change has been received by the sensor and processed by the controller as an operating instruction.

Illustration 36. The automatic swimming pool cleaner of any preceding or subsequent illustrations or combination of illustrations, wherein the feedback generator is a motor of the automatic swimming pool cleaner.

Illustration 37. The automatic swimming pool cleaner of any preceding or subsequent illustrations or combination of illustrations, wherein the feedback generator comprises a speaker or light source on the housing.

Illustration 38. A method of controlling an automatic swimming pool cleaner configured to operate within water of a swimming pool, the method comprising: detecting, by a sensor on the automatic swimming pool cleaner, a physical change of the automatic swimming pool cleaner; determining, by a controller on the automatic swimming pool cleaner, an operating instruction for the automatic swimming pool cleaner based on the detected physical change; and controlling, by the controller, the automatic swimming pool cleaner pursuant to the determined operating instruction.

Illustration 39. The method of any preceding or subsequent illustrations or combination of illustrations, wherein controlling the automatic swimming pool cleaner comprises at least one of making linear movements with the automatic swimming pool cleaner, making rotational movements of the swimming pool cleaner, surfacing the automatic swimming pool cleaner, deactivating components of the automatic swimming pool cleaner, or energizing components of the automatic swimming pool cleaner.

Illustration 40. The method of any preceding or subsequent illustrations or combination of illustrations, wherein detecting the physical change comprises detecting at least one of a vibration, a tilt, a change in rotation, or a change in orientation.

Illustration 41. The method of any preceding or subsequent illustrations or combination of illustrations, further comprising generating a feedback response responsive to the detection of the physical change and determination of the operating instruction.

Illustration 42. The method of any preceding or subsequent illustrations or combination of illustrations, wherein generating the feedback response comprises generating a sound signal with a motor of the automatic swimming pool cleaner.

The above-described aspects are merely possible examples of implementations, merely set forth for a clear understanding of the principles of the present disclosure. Many variations and modifications can be made to the above-described embodiment(s) without departing substantially from the spirit and principles of the present disclosure. All such modifications and variations are intended to be included herein within the scope of the present disclosure, and all possible claims to individual aspects or combinations of elements or steps are intended to be supported by the present disclosure. For avoidance of doubt, any combination of features not physically impossible or expressly identified as non-combinable herein may be within the scope of the invention. Moreover, although specific terms are employed herein, as well as in the claims that follow, they are used only in a generic and descriptive sense, and not for the purposes of limiting the described embodiments, nor the claims that follow.

That which is claimed:

1. A method of communicating with an automatic swimming pool cleaner configured to operate within water of a swimming pool, the method comprising:
    at least while the automatic swimming pool cleaner is operating within the swimming pool, creating a vibration recognizable by a sensor onboard the automatic swimming pool cleaner by physically contacting the automatic swimming pool cleaner at least while the automatic swimming pool cleaner is within the swimming pool, wherein an onboard controller of the automatic swimming pool cleaner is configured to determine an operating instruction based on at least one characteristic of the vibration and control the automatic swimming pool cleaner pursuant to the determined operating instruction.

2. The method of claim 1, wherein creating the vibration comprises generating the vibration with a vibration device.

3. The method of claim 1, further comprising tilting the automatic swimming pool cleaner in a manner recognizable by the sensor of the automatic swimming pool cleaner, wherein the tilting furnishes an operating instruction to the automatic swimming pool cleaner.

4. The method of claim 1, wherein the sensor comprises an accelerometer.

5. The method of claim 1, wherein the at least one characteristic of the vibration comprises a location of the physical contact on the automatic swimming pool cleaner.

6. A method of controlling an automatic swimming pool cleaner configured to operate within water of a swimming pool, the method comprising:
    receiving, by the automatic swimming pool cleaner, and from an external source, a purposefully-generated wireless communication from the external source to the automatic swimming pool cleaner at least while the automatic swimming pool cleaner is operating within the swimming pool, wherein the wireless communication causes a physical change of the automatic swimming pool cleaner;
    determining, by a controller on the automatic swimming pool cleaner, an operating instruction for the automatic swimming pool cleaner based on the physical change caused by wireless communication; and
    controlling, by the controller, the automatic swimming pool cleaner pursuant to the determined operating instruction.

7. The method of claim 6, wherein controlling the automatic swimming pool cleaner comprises at least one of making linear movements with the automatic swimming pool cleaner, making rotational movements of the swimming pool cleaner, surfacing the automatic swimming pool cleaner, deactivating components of the automatic swimming pool cleaner, or energizing components of the automatic swimming pool cleaner.

8. The method of claim 6, wherein detecting the physical change comprises detecting at least one of a vibration, a tilt, a change in rotation, or a change in orientation.

9. The method of claim 6, further comprising generating a feedback response responsive to the detection of the physical change and determination of the operating instruction.

10. The method of claim 9, wherein generating the feedback response comprises generating a sound signal with a motor of the automatic swimming pool cleaner.

11. The method of claim 9, wherein the operating instruction comprises a type of movement of the automatic swimming pool cleaner, and wherein controlling the automatic swimming pool cleaner pursuant to the determined operating instruction comprises controlling the automatic swimming pool cleaner to navigate with a linear movement.

12. The method of claim 9, wherein the operating instruction comprises a type of movement of the automatic swimming pool cleaner, and wherein controlling the automatic swimming pool cleaner pursuant to the determined operating instruction comprises controlling the automatic swimming pool cleaner to navigate with a non-linear movement.

13. The method of claim 9, wherein the operating instruction comprises a type of movement of the automatic swimming pool cleaner, and wherein controlling the automatic swimming pool cleaner pursuant to the determined operating instruction comprises controlling the automatic swimming pool cleaner to navigate to a waterline of the swimming pool.

14. The method of claim 9, wherein the operating instruction comprises instructions for activating or deactivating a motor of the automatic swimming pool cleaner, and wherein controlling the automatic swimming pool cleaner pursuant to the determined operating instruction comprises activating or deactivating the motor of the automatic swimming pool cleaner.

15. The method of claim 9, wherein the operating instruction comprises instructions for activating or deactivating a pump of the automatic swimming pool cleaner, and wherein controlling the automatic swimming pool cleaner pursuant to the determined operating instruction comprises activating or deactivating the pump of the automatic swimming pool cleaner.

* * * * *